US009411601B2

(12) United States Patent
Zimmer et al.

(10) Patent No.: US 9,411,601 B2
(45) Date of Patent: Aug. 9, 2016

(54) FLEXIBLE BOOTSTRAP CODE ARCHITECTURE

(71) Applicants: Vincent J. Zimmer, Federal way, WA (US); H. P. Anvin, San Jose, CA (US); Michael A. Rothman, Puyallup, WA (US); David C. Estrada, Beaverton, OR (US); Nicholas J. Yoke, Tigard, OR (US); Gopinatth Selvaraje, Portland, OR (US)

(72) Inventors: Vincent J. Zimmer, Federal way, WA (US); H. P. Anvin, San Jose, CA (US); Michael A. Rothman, Puyallup, WA (US); David C. Estrada, Beaverton, OR (US); Nicholas J. Yoke, Tigard, OR (US); Gopinatth Selvaraje, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 236 days.

(21) Appl. No.: 14/128,116

(22) PCT Filed: Oct. 29, 2013

(86) PCT No.: PCT/US2013/067172
§ 371 (c)(1),
(2) Date: Dec. 20, 2013

(87) PCT Pub. No.: WO2015/065323
PCT Pub. Date: May 7, 2015

(65) Prior Publication Data
US 2015/0121055 A1 Apr. 30, 2015

(51) Int. Cl.
*G06F 9/00* (2006.01)
*G06F 9/24* (2006.01)
*G06F 15/177* (2006.01)
*G06F 9/44* (2006.01)

(52) U.S. Cl.
CPC .................................. *G06F 9/4401* (2013.01)

(58) Field of Classification Search
CPC .............................. G06F 9/441; G06F 9/44505
USPC .................................................. 713/1, 2, 100
See application file for complete search history.

(56) References Cited

U.S. PATENT DOCUMENTS

| | | | | |
|---|---|---|---|---|
| 5,999,952 A | * | 12/1999 | Jenkins | G06F 1/16 361/679.21 |
| 6,321,332 B1 | * | 11/2001 | Nelson | G06F 9/4403 711/202 |
| 6,601,166 B1 | * | 7/2003 | Ayyar | G06F 9/4416 709/222 |

(Continued)

OTHER PUBLICATIONS

Smith, Rod, Managing EFI Boot Loaders for Linux: Basic Principles, Apr. 27, 2013, http://www.rodsbooks.com/efi-bootloaders/principles.html.*

(Continued)

*Primary Examiner* — Mark Connolly
(74) *Attorney, Agent, or Firm* — Grossman, Tucker, Perreault & Pfleger, PLLC (57) ABSTRACT

The present disclosure is directed to flexible bootstrap code architecture. A device may comprise equipment for operating the device and an operating system (OS) for operating the equipment. A boot module may also be included in the device to execute boot operations. At least one flexible boot (FB) module in the boot module may interact with the equipment and/or OS during the boot operations to cause the boot operations to become device-specific. An example boot module may comprise a plurality of FB modules. An example FB module may verify a device/chipset identification and may control the boot operations based on the identification. Other example FB modules may select resources to load based on an OS type, may provide a boot configuration table location for use in OS runtime boot configuration or may load variables from a preload variable directory for use in configuring boot operations.

24 Claims, 7 Drawing Sheets

(56) References Cited

U.S. PATENT DOCUMENTS

| | | | | |
|---|---|---|---|---|
| 6,643,772 | B1* | 11/2003 | Aguilar | G06F 9/4416 713/2 |
| 6,668,318 | B1* | 12/2003 | Jenkins | G06F 1/16 713/1 |
| 7,080,246 | B2* | 7/2006 | Rothman | G06F 9/4411 713/100 |
| 7,107,441 | B2* | 9/2006 | Zimmer | G06F 9/4411 713/1 |
| 8,745,366 | B2* | 6/2014 | Wyatt | G09G 5/36 345/522 |
| 2004/0148596 | A1* | 7/2004 | Watson | G06F 8/65 717/168 |
| 2008/0155071 | A1* | 6/2008 | Lindstrom | H04W 8/205 709/220 |
| 2008/0172554 | A1* | 7/2008 | Armstrong | G06F 9/45541 713/2 |
| 2011/0010747 | A1* | 1/2011 | Liang | H04N 21/43607 725/116 |

OTHER PUBLICATIONS

ROG, ASUS Z77 Motherboard UEFI BIOS Tuning Guide, Jul. 16, 2012, http://rog.asus.com/129672012/maximus-motherboards/asus-z77-motherboard-uefi-bios-tuning-guide/.*

Raja@ ASUS, ASUS Rampage IV Extreme—UEFI Guide for Overclocking, Nov. 14, 2011, https://rog.asus.com/forum/showthread.php?5835-ASUS-Rampage-IV-Extreme-UEFI-Guide-for-Overclocking.*

Kozierok, Charles, System Boot Sequence, Apr. 17, 2001, http://www.pcguide.com/ref/mbsys/bios/bootSequence-c.html.* http://en.wikipedia.orgi/wiki/Linus-Torvalds; page last modified Jan. 6, 2016; 9 pages.

Torvalds, Linus; "EFI Sucks," http://www.linuxtoday.com/infrastructure/linus-torvalds-efi-sucks.html; Linux Today; May 12, 2012; 1 page.

Protalinski, Emil; "Microsoft mulling 128-bit versions of Window 8, Windows 9;" http://arstechnica.com/information-technology/2009/10/microsoft-mulling-128-bit-versions-of-windows-8-windows-9; Oct. 7, 2009, 4 pages.

http://edk2.sourceforge.net; Tianocore.org; 1 page.

Shah, Agam; "New boot firmware a step toward 64-bit Windows RT;" ComputerWorld; May 8, 2013; 3 pages.

Sinfosky, Steven; "Delivering fast boot times in Windows 8;" https://blogs.msdn.microsoft.com/b8/2011/09108/delivering-fast-boot-times-in-windows-8); Sep. 8, 2011, 5 pages.

Unified Extensible Firmware Interface Specification; Version 2.5, Apr. 2015; Section 21: EFI Byte Code Virtual Machine; pp. 985-1055.

* cited by examiner

FLEXIBLE BOOTSTRAP CODE ARCHITECTURE

TECHNICAL FIELD

The present disclosure relates to device boot operations, and more particularly, to a flexible bootstrap code that is able to adapt to different characteristics of the booting device.

BACKGROUND

The rapid pace of development in computing technology has created a demand for flexibility in regard to interaction between hardware and software. For example, emerging computing devices, operating systems (OS), applications, etc. need to have some degree of interplay so that older hardware may remain compatible with newer software and vice versa. The introduction of open architectures has also created a need for flexibility. The scenario wherein equipment may be configured to run only certain software (e.g., an OS) identified by the equipment manufacturer still exists, but has been joined by a variety of other providers that may cater to different equipment/software configurations. These providers include large companies, small companies, consortiums, alliances, educational institutions, hobbyists, etc. From this large array of providers users may incorporate hardware and software to meet their specific needs, selecting features based on their requirements for performance, reliability, etc.

While the ability to choose from a variety of solutions may be enticing to consumers, it does not come without some challenges. For example, integrating equipment with software obtained from different sources may entail the creation of an OS/hardware combination that was intended or even envisioned by the various providers. Bootstrap operations that may be executed during device startup are intended to establish links between the software aspects and hardware resources of a device. As the technology within computing devices continues to evolve, the traditional manner in which bootstrap operations are implemented is becoming unable to handle the increasing number of possible device/OS combinations made available by the variety of sources in the marketplace. The inability for traditional bootstrap operations to adapt to these combinations is becoming problematic to development, and has been noted as an impediment to hardware/software integration by some open source software providers.

BRIEF DESCRIPTION OF THE DRAWINGS features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

The present disclosure is directed to flexible bootstrap code architecture. A device may comprise equipment for operating the device and an operating system (OS) for operating the equipment. A boot module may also be included in the device to execute toot operations when the device is activated. At least one flexible boot (FB) module in the boot, module may interact with the equipment and/or OS during the boot operations to cause the boot operations to become device-specific. An example boot module may comprise separate FB modules for performing different functions. An example FB module may verify a device and/or chipset identification and control the boot operations based on the identification. Other example FB modules may select resources to load (e.g., a kernel) based on a determined OS type, may provide the location of a boot configuration table for use in OS runtime boot configuration or may load variables from a preload variable directory for use in configuring boot operations.

In one embodiment, an example device may comprise at least equipment, an OS and a boot module. The equipment may be to provide functionality in the device. The OS may be to facilitate operation of the equipment. The boot module may be to execute boot operations following activation of the device, the boot module including at least one flexible boot (FB) module to, for example, interact with at least one of the equipment or the OS during the boot operations and generate device-specific boot operations based on the interaction.

In one embodiment, the at least one FB module operates based on bytecode included in the boot module, the bytecode being interpreted during the boot operation. The at least one FB module being to generate device-specific boot operations based on the interaction may comprise, for example, the at least one FB module being to cause the boot operations to be aborted if at least one of a device identification or a chipset identification is not recognized. The at least one FB module being to generate device-specific boot operations based on the interaction may further comprise, for example, the at least one FB module being to cause a particular kernel to be loaded in the device during the boot operation based on a word length associated with the OS. The word length may be sensed based on, for example, calculating the size of a natural integer during the boot operations. The at least one boot module being to interact with at least one of the equipment or the OS during the boot operations may comprise, for example, the at least one boot module being to sense boot variables existing in a particular directory in the device. The at least one FB module being to generate device-specific boot operations based on the interaction may further comprise, for example, the at least one FB module being to cause at least one of data to be copied from the boot module to the boot variables or data to be copied to the boot module from the boot variables prior to loading the OS in the device.

In the same or a different embodiment, the at least one FB module being to generate device-specific boot operations based on the interaction may further comprise, for example, the at least one FB module being to make information in the boot module accessible to at least one of the equipment or the OS by causing a physical address to be written, to a non-volatile variable in a memory in the device, the physical address indicating the location of a configuration table associated with the boot module in the memory. In such an instance, the OS may comprise an application program interface to allow the OS to access the contents of the non-volatile variable in the memory. In one example implementation, the boot module may be based on the Unified Extensible Firmware Interface (UEFI) specification.

A method consistent with the present disclosure may comprise for example, initiating boot operations in a device comprising at least equipment, an OS and a boot module, determining if the boot module includes at least one FB module to interact with at least one of the equipment or the OS during the boot operations and performing default boot operations or device-specific boot operations based on the determination if the boot module includes at least one FB module. Performing device-specific boot operations may comprise, for example, causing the boot operations to be aborted if at least one of a device identification or a chipset identification, sensed from the equipment is not recognized. Performing device-specific boot operations may further comprise, for example, causing a particular kernel to be loaded in the device during the boot operation based on a word length associated with the OS. The word length may be sensed based on, for example, calculating the size of a natural integer during the boot operations. Interacting with at least one of the equipment or the OS during the boot operations may comprise, for example, sensing boot variables existing in a particular directory in the device. Performing device-specific boot operations may further comprise, for example, causing at least one of data to be copied from the boot module to the boot variables or data to be copied to the boot module from the boot variables prior to loading the OS in the device. Performing device-specific boot operations may further comprise, for example, making information in the boot module accessible to at least one of the equipment or the OS by causing a physical address to be written to a non-volatile variable in a memory in the device, the physical address indicating the location of a configuration table associated with the boot module in the memory. In such an instance, the OS may comprise an application program interface to allow the OS to access the contents of the non-volatile variable in the memory, in one example implementation, the boot module may be based on the Unified Extensible Firmware Interface (UEFI) specification.

Figure 1:
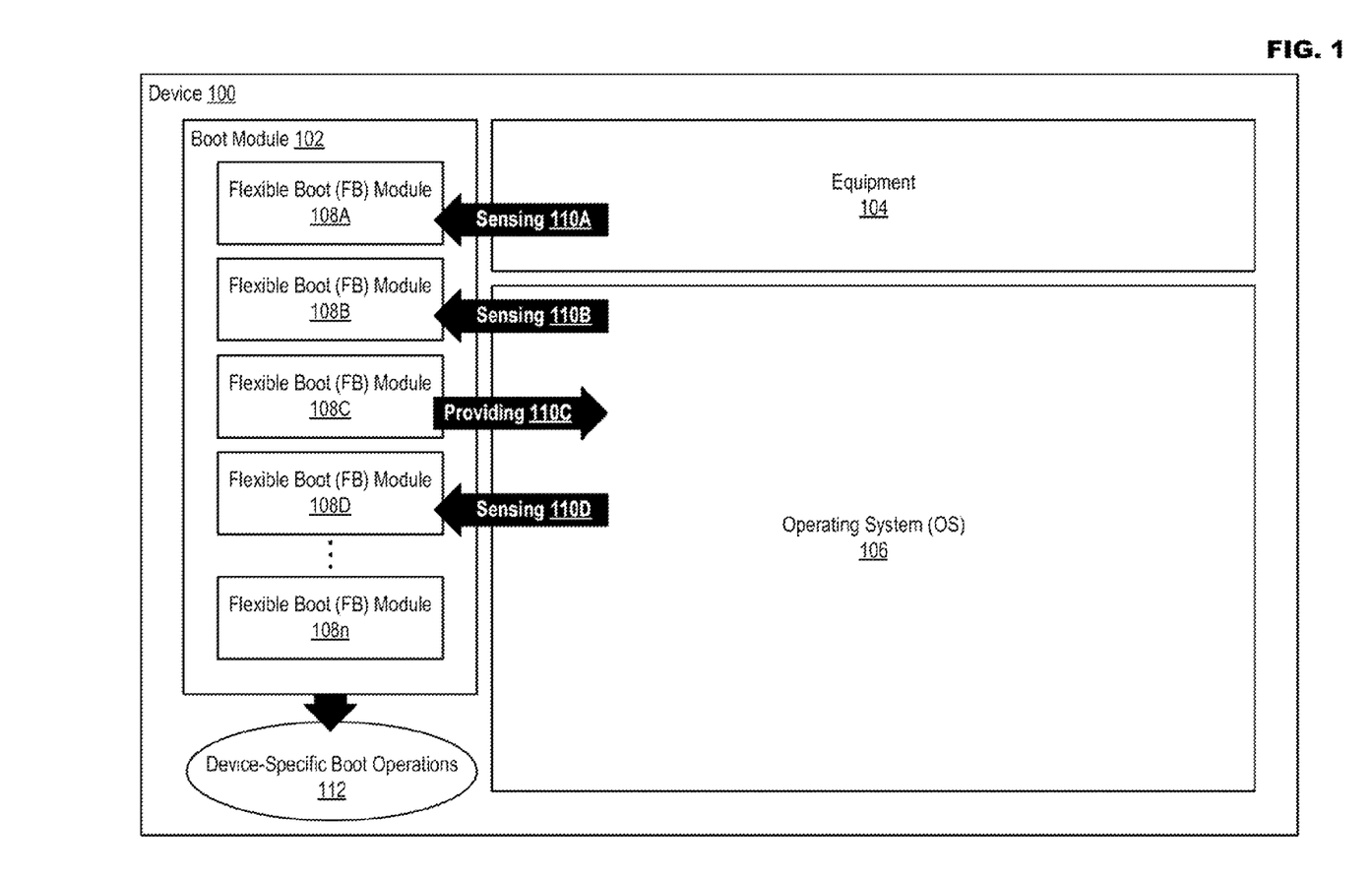
FIG. 1 illustrates an example device including flexible bootstrap code architecture in accordance with at least one embodiment of the present disclosure.

FIG. 1 illustrates an example device including flexible bootstrap code architecture in accordance with at least one embodiment of the present disclosure. The following disclosure may utilize terminology such as "bootstrap," or "boot" to reference resources (e.g., hardware, software, etc.) that may be active (e.g., executing boot operations) after a device is activated. Boot operations may launch various drivers, a kernel, etc. to provide an interlace over which hardware and software (e.g., an OS) may interact. Known specifications for boot code may comprise Basic Input/Output System (BIOS), Unified Extensible Firmware Interface (UEFI), etc. While many examples presented herein may utilize terminology, elements, systems, etc, commonly associated with UEFI, these references have been made merely for the purpose of explanation. Various embodiments consistent with the present disclosure are not limited to implementation only using UEFI, and may employ coding based on other boot specifications.

FIG. 1 discloses an example device including flexible bootstrap code architecture. In general, device 100 may be any processor-driven computing device. Examples of device 100 may include, but are not limited to, a mobile communication device such as a cellular handset or a smartphone based on the Android® OS, iOS®, Windows® OS, Blackberry® OS, Palm® OS, Syrabian® OS, etc., a mobile computing device such as a tablet computer like an iPad®, Surface®, Galaxy Tab®, Kindle Fire®, etc., an Ultrabook® including a low-power chipset manufactured by Intel Corporation, a netbook, a notebook, a laptop, a palmtop, etc., a typically stationary computing device such as a desktop computer, a server, a set-top box, a smart television, a specialized controller (e.g., automation controller), etc. Device 100 may comprise boot module 102, equipment 104 and OS 106. Boot module 102 may comprise hardware such as a non-volatile (NV) memory in which boot code may be stored. Boot code typically includes compiled program code that executes boot operations when device 100 is activated (e.g., due to device 100 powering up, from a command to reboot device 100, etc.). In general, boot operations may configure device 100 so that equipment 104 may be able to interact with OS 106. Equipment 104 may include at least any hardware in device 100, OS 106 may comprise a software-based control system for managing operations in device 100.

Boot module 102 may comprise, for example, FB module 108A, FB module 308B, FB module 108C, FB module 108D . . . FB module 108n (collectively, FB modules 108A . . . n). While five (5) FB modules 308A . . . n have been illustrated in FIG. 1, in practice the number of FB modules 108A . . . n may vary depending upon the particular implementation. In one embodiment, FB modules 108A . . . n may be portions of code within the boot code executed by boot module 102 when device 100 is activated. During operation, FB modules 108A . . . n may interact with equipment 104 and/or OS 106 as shown by interactions 110A, 110B, 110C and 110D (collectively interactions 110A . . . D). Examples interactions 110A . . . D may include sensing 110A, sensing 110B, providing 110C and sensing 110D. In sensing 110A, 110B and 110D, FB modules 108A, 108B and 108D, respectively, may determine some characteristic of equipment 104 and/or OS 106 for use in formulating device-specific boot operations 112. Alternatively, in providing 110C. FB module 108C may provide information to equipment 104 and/or OS 106 during device specific boot operations 112. Examples of FB modules 108A . . . D, interactions 110A . . . D and how interactions 110A . . . D may affect device-specific boot operations 112 will be disclosed further in regard to FIG. 3 to 7.

Figure 2:
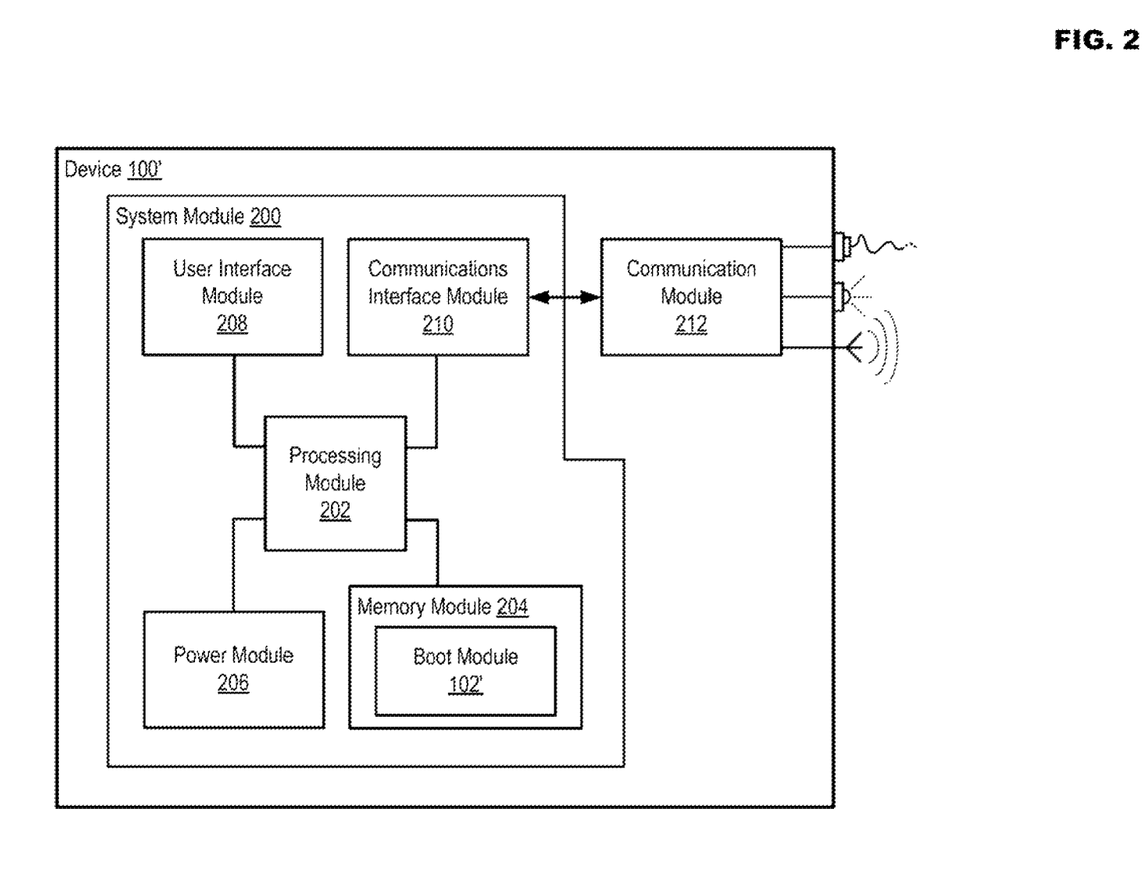
FIG. 2 illustrates an example configuration for a device in accordance with at least one embodiment of the present disclosure.

FIG. 2 illustrates an example configuration for a device in accordance with at least one embodiment of the present disclosure. In particular, device 100' may be able to perform example functionality such as disclosed in FIG. 1. However, device 100' is meant only as an example of equipment usable in embodiments consistent with the present disclosure, and is not meant to limit these various embodiments to any particular manner of implementation.

Device 100' may comprise, for example, system module 200 configured to manage device operations. System module 200 may include, for example, processing module 202, memory module 204, power module 206, user interface module 208 and communication interface module 210. Device 100" may also include communication module 212 that may interact with communication interface module 210. While communication module 212 has been shown separately from system module 200, the example implementation of device 100" has been provided merely for the sake of explanation herein. Some or all of the functionality associated with communication module 212 may also be incorporated in system module 200.

In device 100", processing module 202 may comprise one or more processors situated in separate components, or alternatively, one or more processing cores embodied in a single component: (e.g., in a System-on-a-Chip (SoC) configuration) and any processor-related support circuitry (e.g., bridging interfaces, etc.). Example processors may include, but are not limited to, various x86-based microprocessors available from the Intel Corporation including those in the Pentium, Xeon, Itanium, Celeron, Atom, Core i-series product families. Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 202 may interact, with other system, components that may be operating at different speeds, on different buses, etc, in device 100'. Some or all of the functionality commonly associated with the support circuitry may also be included in the same physical package as the processor (e.g., such as in the Sanely Bridge family of processors available from the Intel Corporation).

Processing module 202 may be configured to execute various instructions in device 100'. Instructions may include program, code configured to cause processing module 202 to perform activities related to reading data, writing data, processing data, formulating data, converting data, transforming data, etc. Information (e.g., instructions, data, etc.) may be stored in memory module 204. Memory module 204 may comprise random access memory (RAM) or read-only memory (ROM) in a fixed or removable format. RAM may include volatile memory configured to hold information during the operation of device 100' such as for example, static RAM (SRAM) or Dynamic RAM (DRAM). ROM may include non-volatile (NV) memory configured with boot module 102' (e.g., based on BIOS, UEFI, etc.) to provide instructions when device 100' activates, programmable memories such as electronic programmable ROMs (EPROMS), Flash, etc. Other fixed/removable memory may include, but are not limited to, magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), etc.

Power module 206 may include internal power sources (e.g., a battery) and/or external power sources (e.g., electromechanical or solar generator, power grid, fuel cell etc), and related circuitry configured to supply device 100' with the power needed to operate. User interface module 208 may include equipment and/or software to allow users to interact with device 100' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, etc.) and various output mechanisms (e.g., speakers, displays, lighted/flashing indicators, electromechanical components for vibration, motion, etc.). The equipment in user interface, module 208 may be incorporated within device 100' and/or may be coupled to device 100' via a wired or wireless communication medium.

Communication interface module 210 may be configured to manage packet routing and other control functions for communication module 212, which may include resources configured to support wired and/or wireless communications, in some instances, device 102' may comprise more than one communication module 212 (e.g., including separate physical interface modules for wired protocols and/or wireless radios) all managed by a centralized communication interface module 210. Wired communications may include serial and parallel wired mediums such as, for example, Ethernet, Universal Serial Bus (USB), Firewire, Digital Video Interface (DVI), High-Definition Multimedia Interface (HDMI), etc. Wireless communications may include, for example, close-proximity wireless mediums (e.g., radio frequency (RF) such as based on the Near Field Communications (NFC) standard, infrared (IR), etc.), short-range wireless mediums (e.g., Bluetooth, WLAN, Wi-Fi, etc.) and long range wireless mediums (e.g., cellular wide-area radio communication technology, satellite-based communications, etc.). In one embodiment, communication interface module 210 may be configured to prevent wireless communications that are active in communication module 212 from interfering with each other. In performing this function, communication interface module 210 may schedule activities tor communication module 212 based on, for example, the relative priority of messages awaiting transmission. While the embodiment disclosed in FIG. 2 illustrates communication interface module 210 being separate from communication module 212, it may also be possible for the functionality of communication interface module 210 and communication module 212 to be incorporated within the same module.

Figure 3:
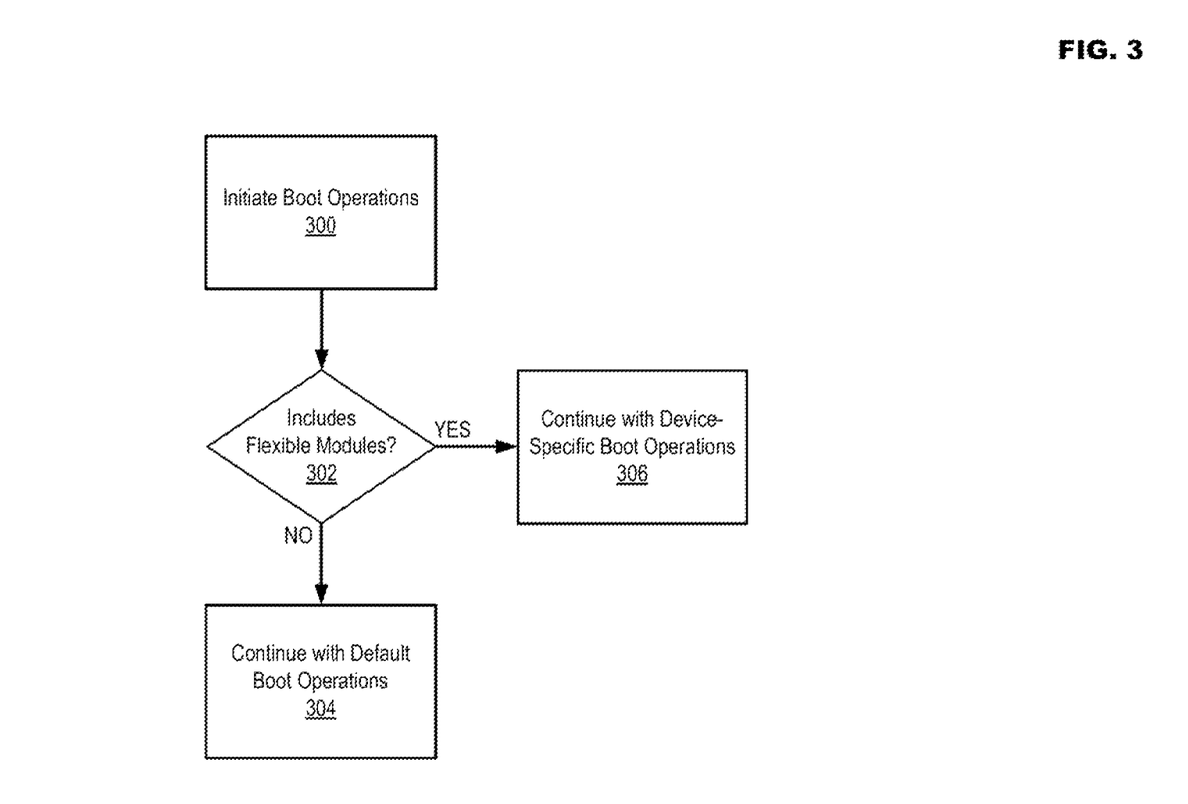
FIG. 3 illustrates example operations for implementing flexible bootstrap code architecture in accordance with at least one embodiment of the present disclosure.

FIG. 3 illustrates example operations for implementing flexible bootstrap code architecture in accordance with at least one embodiment of the present disclosure. Initially, the execution of some or all of the operations disclosed in FIG. 3 to 7 may be orchestrated through the use of an interpreted boot code instead of a traditional compiled boot code. The use of an interpreted boot code over a compiled boot code may allow for logical operations to be made during execution of the boot code, and thus, for the activities occurring in the boot code to be modified based on interactions 110A ... D. In an example implementation where boot code based on the UEFI specification is utilized, EFI byte code (BBC) is an interpreted byte code that may be employed to implement example operations such as disclosed in FIG. 3 to 7, BBC was originally designed for supporting portable drivers in host bus adapter CUBA) cards on the peripheral component interconnect (PCI) bus, but may lie repurposed for general use in executing various boot-related operations such as disclosed in the following examples.

FIG. 3 discloses a general operational flow consistent with various embodiments of the present disclosure. In operation 300, boot operations may be initiated in device 100. For example, device 100 may be powered on from an unpowered state, may be rebooted from a powered state, etc. A determination may then be made in operation 302 as to whether boot module 102 in device 100 includes at least one FB module 108A ... n. If it is determined in operation 302 that boot module 102 does not include at least one FB module 108A ... n, then in operation 304 device 100 may continue with default boot operations. On the other hand, if in operation 302 it is determined that device 102 includes at least one FB module 108A ... n, then in operation 306 device 100 may continue with device-specific hoot operations. FIG. 4 to 7 disclose examples of device-specific boot operations that may be implemented alone or in combination in various embodiments consistent with the present disclosure.

Figure 4:
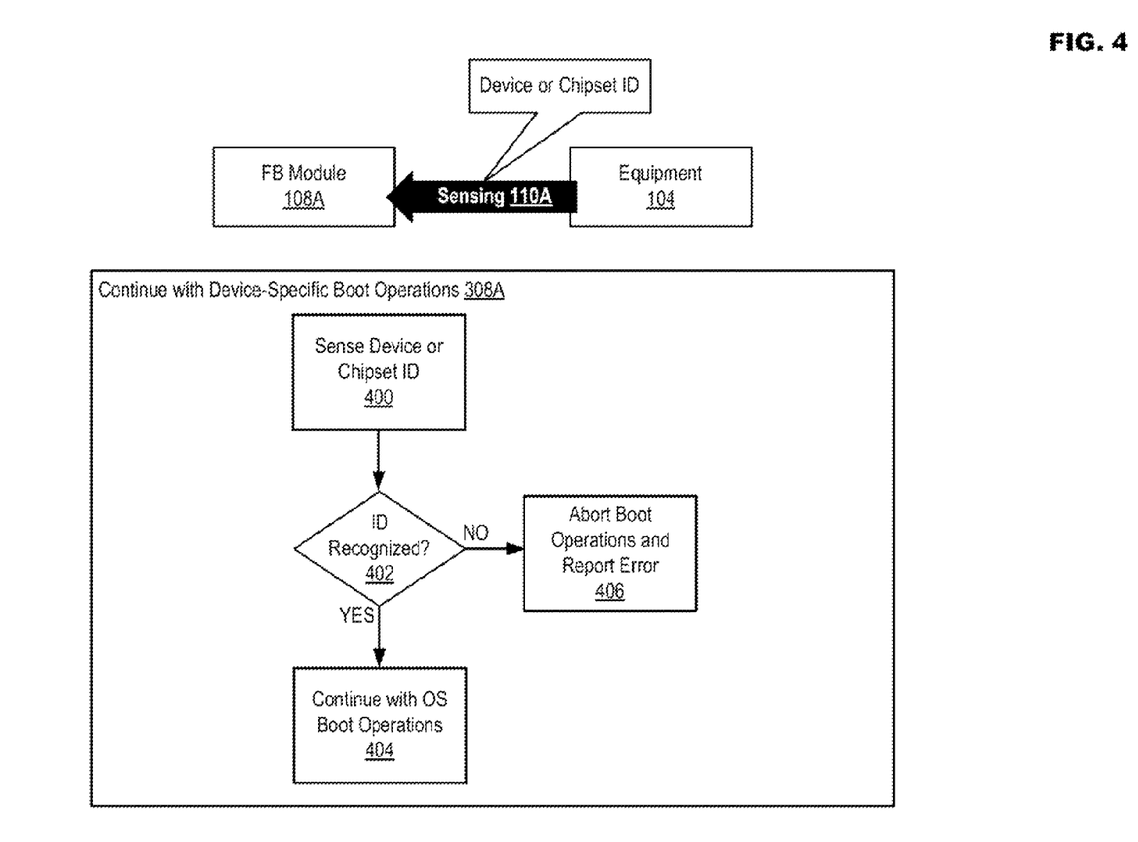
FIG. 4 illustrates example device-specific operations for sensing a device or chipset identification in accordance with at least one embodiment of the present disclosure.

FIG. 4 illustrates example device-specific operations for sensing a device or chipset identification in accordance with at least one embodiment of the present disclosure. In FIG. 4, example boot operations are disclosed that may control whether device 100 may be booted based on device or chipset identification (ID), For example, as the variety of providers for hardware and software continues to expand, so do the various combinations of equipment 104 and/or OS 106 that may be implemented. It may be advantageous to both computing device manufacturers and end users to allow only certain equipment 104 (e.g., processors, memory, etc.) to be employed from a compatibility, performance or even strategic standpoint. In one scenario, a manufacturer may utilize functionality such as disclosed in FIG. 4 to ensure that quality is maintained in the computing products delivered to their customers regardless of the ability to swap out equipment 104 by the supply chain, user, etc. Further, technology may be protected by ensuring that only certain binaries can be used with certain equipment 104, the appeal of theft may be diminished by making it difficult to swap in stolen equipment 104, etc.

In operation 400, a device or chipset ID may be sensed (e.g., by FB module 108A). In an instance of where UEFI is utilized, UEFI drivers can be delivered as binary images in the .efi PE/COFF format that are compatible with an EBC interpreter. The resulting UEFI-based interpreted bytecode may be employed to probe device 100 for a specific device or chipset ID. Moreover, tamper-resistant software may be employed so that FB module 108A may not be reverse-engineered (e.g., for the purpose of defeating the device/chipset ID verification). The drivers may further be encapsulated as authenticated code modules (ACMs) which may be signed by a chipset key (e.g., in a trusted execution environment such as a secure enclave). The device or chipset ID may correspond to a manufacturer of the device or chipset, a model of the device or chipset, a serial number of the device or chipset, etc. Chipset ID may further include an ID corresponding to an individual component in the chipset (e.g., if available). A determination may then be made in operation 402 as to whether the device or chipset ID is recognized. If in operation 402 the device or chipset ID is recognized, then in operation 404 the device may be allowed to continue with OS boot operations. Alternatively, if in operation 402 the device or chipset ID is not recognized, then in operation 406 the boot operation may be aborted and an error may be reported. Error reporting may include, for example, a visible alert and/or an audible alarm presented via user interface module 208, a message being sent outside, of device 100 via communication module 212 (e.g., to the device manufacturer), etc. Following the report, aborting the boot operations may result in device 100 powering down.

Figure 5:
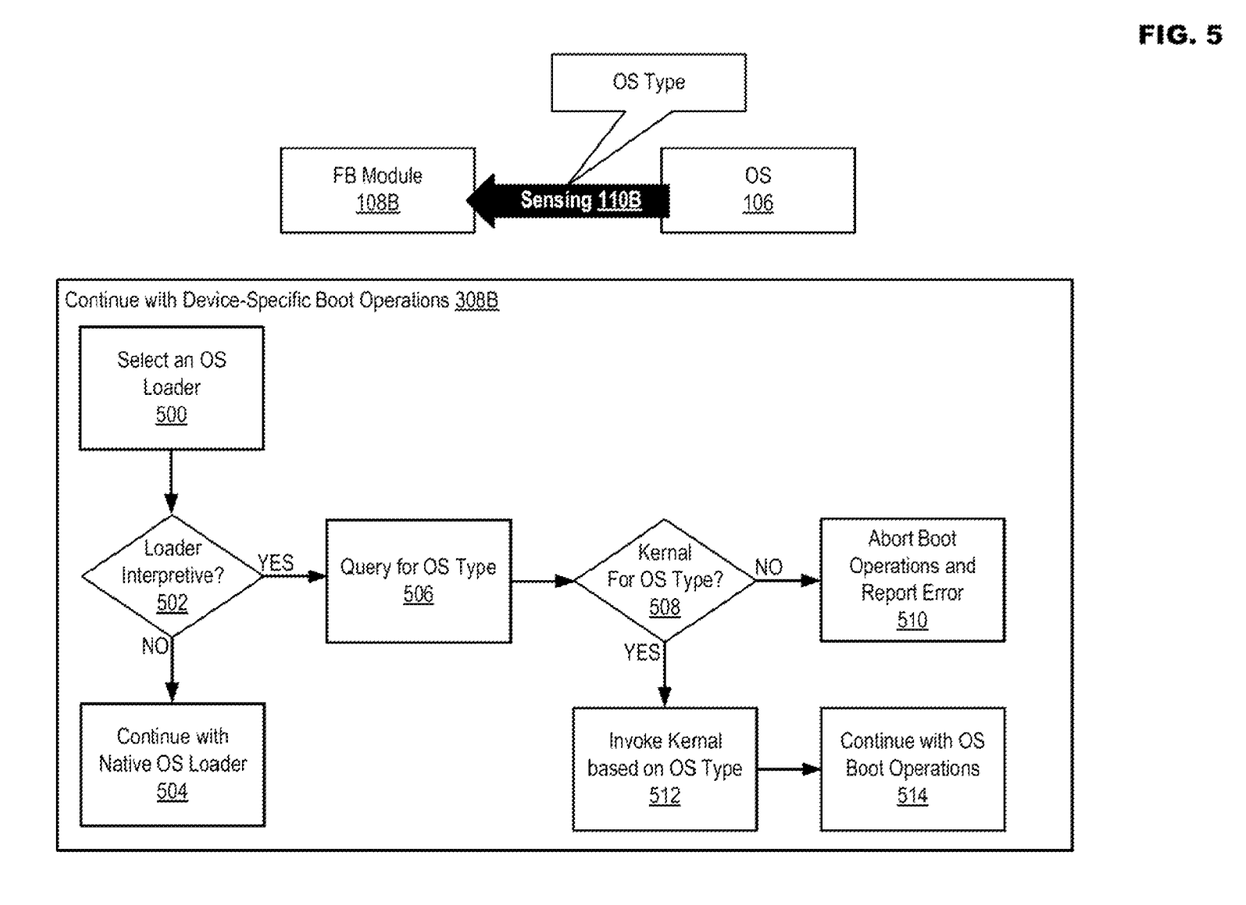
FIG. 5 illustrates example device-specific operations for sensing an operating system type in accordance with at least one embodiment of the present disclosure.

FIG. 5 illustrates example device-specific operations for sensing an operating system, type in accordance with at least one embodiment of the present disclosure. FB module 108B in FIG. 5 may be configured to sense at least an OS type during execution of boot operations. For example, existing PC/AT BIOS may be able to launch a 32-bit or 64-bit OS. However, in instances where boot module 102 is based on UEFI, boot module 102 can only launch an OS kernel that was compiled against the same application binary interface (ABI) as boot module 102 (e.g., a 64-bit UEFI can only launch a 64-bit UEFI-aware OS's). This restriction creates a problem because device 100 cannot validate multiple OS ABIs (e.g., 32-bit or 64-bit), and thus, the flexibility of device 100 to be reconfigured with another OS 106 is severely limited.

In one embodiment, functionality may be incorporated into the boot operations of device 100 to allow for appropriate resources to be launched based on OS 106. In operation 500 a loader for OS 106 may be selected. A determination may then be made in operation 502 as to whether the loader is interpretive. Similar to the example disclosed in FIG. 4, UEFI drivers delivered as binary images in the .efi. PE/COFF format may be employed by an EBC interpreter to perform sensing 110B. If in operation 502 it is determined that the OS loader selected in operation 500 is not interpretive, then in operation 504 the boot operations may continue with a native (e.g., default) OS loader. If in operation 502 it is determined that the selected OS loader is interpretive, then in operation 506 a query may be performed for the type of OS 106. Consistent with the present disclosure, various queries may be performed in operation 506. For example, high-level queries may return OS type, manufacturer, included features, serial number, etc. A more portable way in which to determine the type of OS 106 may be to calculate a size for a natural integer in OS 106. When UEFI is employed, integer size may be determined by the "sizeof(INTN)" command. Integer size may be determinative of OS type in that the size of an integer in a 32-bit OS is smaller than the size in a 64-bit OS.

A determination may then be made it) operation 508 as to whether a kernel is present in device 100 corresponding to the type determined for OS 106. If in operation 508 it is determined that an appropriate kernel does not exist in device 100, then in operation 510 the boot operations may be aborted and an error reported. Similar to the above, in reporting the error an alert message may be displayed and/or an audible alarm may be generated in device 100, possibly along with information being transmitted (e.g., to the manufacturer of device 100). If in operation 508 it is determined that at least one kernel in device 100 is compatible to OS 106, then in operation 512 the compatible kernel may be invoked (e.g., by FB module 108B). Following loading of the kernel, in operation 514 OS boot operations may continue.

Figure 6:
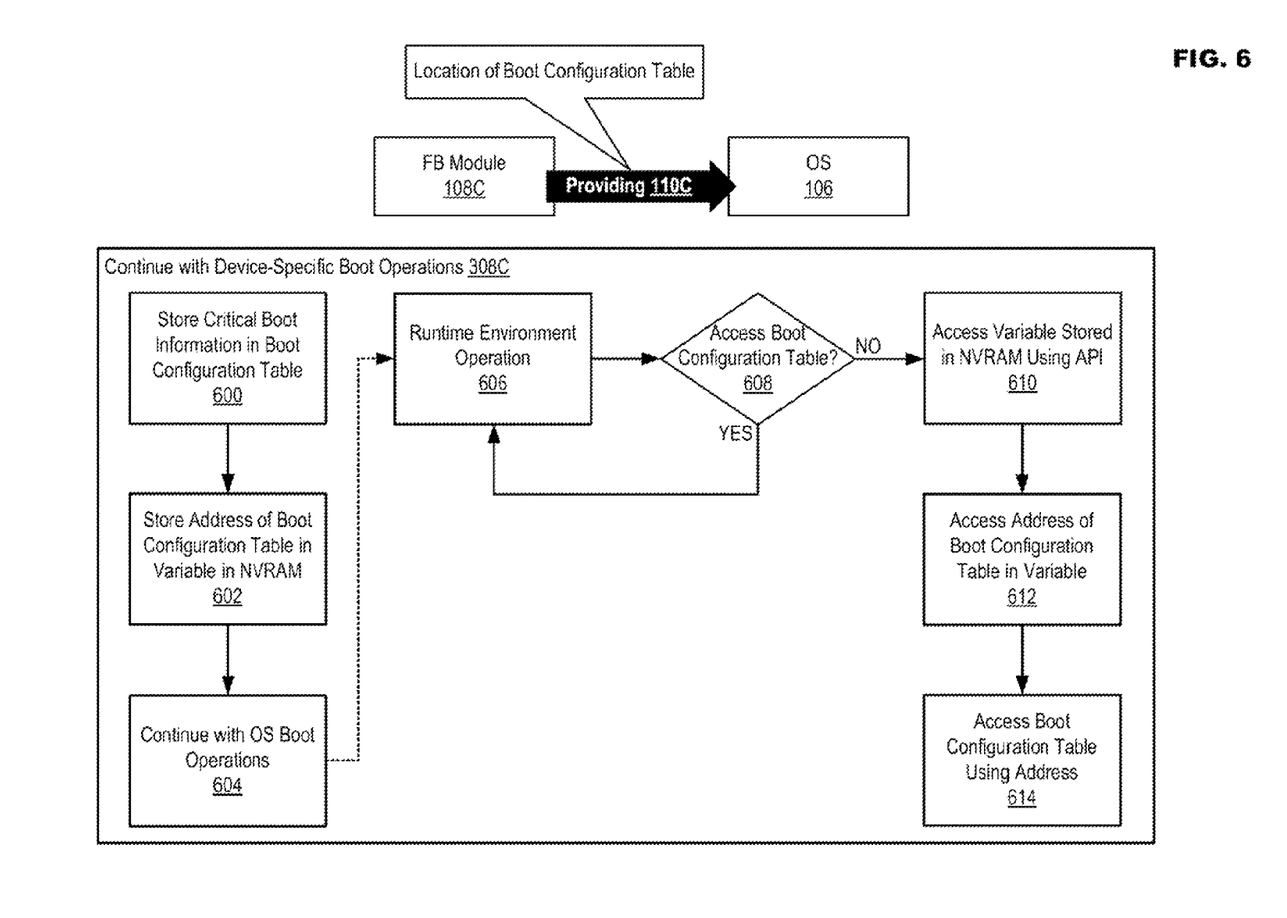
FIG. 6 illustrates example device-specific operations for providing the location of a boot configuration table to the operating system in accordance with at least one embodiment of the present disclosure.

FIG. 6 illustrates example device-specific operations for providing the location of a boot configuration table to the OS in accordance with at least one embodiment of the present disclosure, in general, it may be necessary at times for end users to access boot configuration settings in device 100. Boot configuration settings are typically accessed by interrupting the boot operations in device 100 to bring up a rudimentary user interface. While this manner of configuration has been satisfactory, in a competitive market for computing devices there is an continual effort, to increase user experience. One way that user experience may be improved is through a better looking/functioning user interface. However, the ability to reengineer the user interface provided by boot module 102 is limited by various factors such as the limited size of the NV memory in boot module 102, the desire to not "reinvent the wheel" while also risking infringement of the intellectual property of other parties related to user interfaces, etc.

One possible solution is to move the boot configuration operations to an OS runtime application. This would allow a user to configure boot operations in an environment that is familiar, and thus, improving user experience. However, at least one problem with moving boot configuration to a runtime application is that the boot configuration information is not typically exposed to OS 106. Consistent with the present disclosure, boot configuration may be moved to an OS runtime application by informing OS 106 of the location in memory of the boot configuration information. Using UEFI as an example, the EFI System Table is a data structure that encapsulates the state information of the EFI Operational Environment. The EFI System Table may comprise boot service function pointers, runtime service function pointers, version information and an extensible set of global unique identifier (GUID)/pointer pairs. The first set of services may only be germane prior to pre-boot agents (e.g., operating system loaders) that wish to leverage EFI services and device drivers prior to the instantiation of said drivers in the OS environment. The next set of services may be callable from the OS runtime environment, but may only be callable by the OS kernel directly in order to guarantee mutual exclusion and controlled access. The GUID/Pointer pairs are an extensible collection of 2-tuples. There is a boot service application programming interface (API) that may allow agents to register the two values with the EFI core. Documented GUIDs already provided to support OS 106 via this API may include, but are not limited to, a pointer to the advanced configuration and power interface (ACPI) table, a pointer to the system management BIOS (SMBIOS), and a pointer to the system abstraction layer (SAL) system table. But as this interface only stipulates the naming and pointer, and the namespace of possible GUIDs is unbounded, there is opportunity for other systems to register domain-specific information in this table, which is also known as the EFI configuration table. Making the EFI configuration table accessible to 106 allows ACPI operational, regions to be called into the platform, logic, and in-turn, allows physical address of content registered with the platform to be retrieved. Exposing the EFI configuration table to OS 106 in this manner allows ACPI-compliant OS agents to ask in a standard fashion "where is the EFI Configuration Table" OS 306 may then automatically act as a proxy to the underlying firmware.

In operation 600, critical information may be stored in a boot configuration table (e.g., EFI configuration table). For example, applications, drivers, etc. may store critical data in a pre-boot phase of system initialization following the activation of device 100. In UEFI-based boot modules 102, the location of this critical data in memory may be recorded utilizing GUID/pointer pairs stored in the EFI configuration table. While access to the critical data is needed to support boot configuration in the runtime environment, existing computing device architecture does not expose the EFI configuration table to non-kernel applications drivers.

To circumvent this impediment, in operation 602 the address of the boot configuration table may be stored in an NV variable (e.g., a variable stored in NV memory in boot module 102). For example, FB module 108C may cause the address to be stored in the NV variable, OS boot operations may then be continued in operation 604 followed by device 100 entering the runtime environment in operation 606. Device 100 may continue in the runtime environment until a determination is made in operation 608 that access is required to the boot configuration table. The determination in operation 608 may be based on, for example, the activation, of a boot configuration application by a user of device 100. In operation 610 the variable containing the address of the configuration table may be accessed. In particular, OS 106 must expose access to the NV variable through an OS API. The runtime application may access the NV variable utilizing the API, and in operation 612 may determine the physical address of the boot configuration table based on the contents of the NV variable. The address of the boot configuration, table may be employed by the runtime application in operation 614 to access the boot, configuration table. Accessing the boot configuration table may comprise, for example, reading the contents of the boot configuration table, editing the contents of the boot configuration table, storing new values in the boot configuration table, etc. Accessing the boot configuration table may be accompanied by user interface-related activities such as displaying some or all of the contents of the boot configuration table to a user, facilitating changes to the contents of the boot configuration table based on user interaction, etc.

Figure 7:
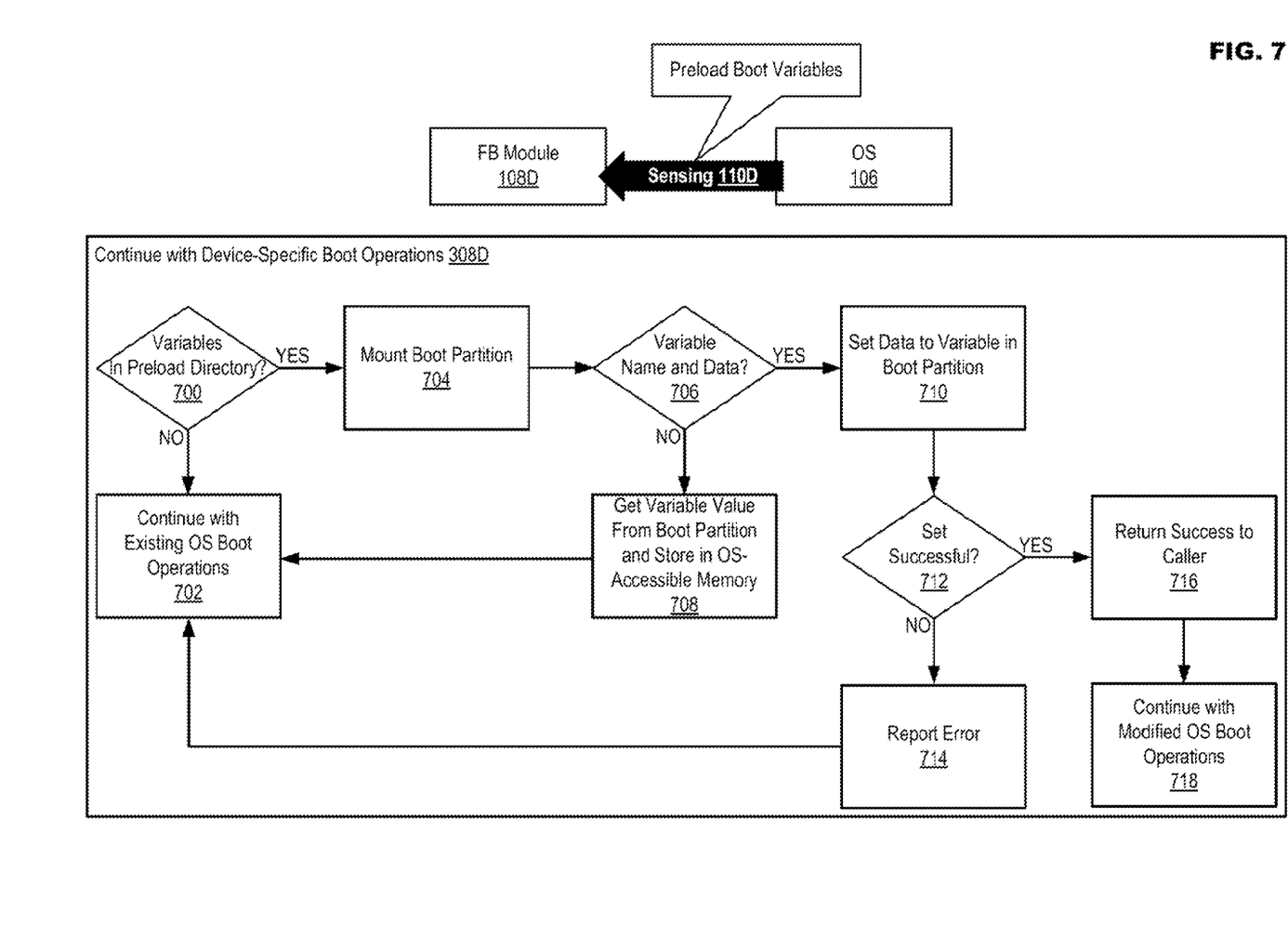
FIG. 7 illustrates example device-specific operations for sensing boot variables in a preload directory in accordance with at least one embodiment of the present disclosure.

FIG. 7 illustrates example device-specific operations for sensing boot variables in a preload directory in accordance with at least one embodiment of the present, disclosure. In general, FIG. 7 describes operations wherein sensing 110D may be performed by FB module 108D to determine whether get/set operations are required for boot variables stored in a preload directory. In existing systems, it may be desirable to map physical addresses in boot module 102 to virtual addresses in a kernel (e.g., invoked during the boot operations) so that OS 106 doesn't need to effect a mode transition when making runtime calls to boot module 102. When boot module 102 is based on UEFI, a function that may be utilized to execute the above mapping is SetVirtualAddress( ) (SetVA). In some instances it may be advantageous to execute the mapping more than once. For example, Linux includes functions like "KEXEC" wherein the loaded kernel may invoke another kernel. Since SetVA is not idempotent (e.g., SetVA cannot be called more than once without changing the result beyond the initial call), the invocation of other kernels by KEXEC will result in further SetVA calls that will break device 100. Existing Linux kernels employ KEXEC for recovery, provisioning, upgrades, etc. The pervasive use of functions like KEXEC may not be exclusive to the Linux OS, and thus, the inability to use functions like KEXEC may impede the acceptance of specifications like UEFI. Fixing this problem has proved to be difficult since it has existed for many years.

Consistent with the present disclosure, a safer approach may be to give OS 106 an alternative to making runtime calls (e.g., relying on SetVA) that may cause device 100 to crash. In situations where boot module 102 is based on UEFI, a frequently used runtime call, is "Set/Get Variable( )" that is exposed via the "efivars" interface in Linux. Instead of having efivars invoke "ST→RT→Get/SetVariable" to get and/or set variables in boot module 102 at runtime, the intended UEFI variable name and data (for sets) and the name (for gets) may be copied to a directory in the EFI System Partition (ESP) called, for example, "/variable." OS 106 may then cause device 100 to reboot. Upon reboot, UEFI firmware in boot module 102 may apply the variable update or copy the active contents of the variable to this directory. In this manner, OS 106 may use its present disk access idioms to stage communication with the UEFI firmware without have to share the machine at runtime, and thus, risk causing an error.

Initially, in operation 700 a determination may be made as to whether variables exist in a preload directory (e.g., "/variables"). The existence of variables in the preload directory may indicate that get and/or set operations are required before boot operations may continue. If in operation 700 it is determined that no variables exist in the preload directory, then boot module 102 may continue with existing OS boot operations in operation 702, If in operation 700 it is determined that variables exist in the preload directory, then in operation 704 a boot partition may be mounted in device 100. A determination may then be made in operation 706 as to whether variable name and a data is stored in the preload directory (e.g., indicating the need for a set operation) or just variable name (e.g., indicating the need for a get operation). If in operation 704 it is determined that the preload directory does not include variable name and data, then in operation 708 a get operation may be performed to obtain the value of the variable from the boot partition, the value being stored in a memory in device 100 accessible to OS 106. Operation 708 may then be followed by a return to operation 702 where the OS boot operations may continue.

If in operation 706 it is determined that the preload directory includes both variable name and data, then in operation 710 a set operation may be performed to set the data in the preload directory to the corresponding variable in boot module 102. A determination may then be made in operation 712 as to whether the set operation was successful. If in operation 712 it is determined that the set operation was not successful, then in operation 714 an error may be reported. Device 100 may then continue with the existing OS boot operation (e.g., without the new data being set in boot module 102) in operation 702. If in operation 712 it is determined that the set was successful, then in operation 716 the success of the set may be returned to the caller, and in operation 718 device 100 may continue with the modified OS boot (e.g., including the new data from the preload directly that was set in boot module 102).

While FIG. 3 to 7 may illustrate operations according to different embodiments, it is to be understood that not all of the operations depicted in FIG. 3 to 7 are necessary for other embodiments. Indeed, it is fully contemplated herein that in other embodiments of the present disclosure, the operations depicted in FIG. 4 to 7, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in tin s application and in the claims, a list of items joined by the term "and/or" can mean any combination of the listed items. For example, the phrase "A, B and/or C" can mean A; B; C; A and B; A and C; B and C; or A, B and C, As used in this application and in the claims, a list of items joined by the term "at least one of" can mean any combination of the listed terms. For example, the phrases "at least one of A, B or C" can mean A; B; C; A and B; A and C; B and C; or A. B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices, "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, the present disclosure is directed to flexible bootstrap code architecture. A device may comprise equipment for operating the device and an operating system (OS) for operating the equipment. A boot module may also be included in the device to execute boot operations. At least one flexible boot (FB) module in the boot module may interact with the equipment and/or OS during the boot operations to cause the boot operations to become device-specific. An example boot module may comprise a plurality of FB modules. An example FB module may verify a device/chipset identification and may control the boot operations based on the identification. Other example FB modules may select resources to load based on an OS type, may provide a boot configuration table location for use in OS runtime boot configuration or may load variables from a preload variable directory for use in configuring boot operations.

The following examples pertain to further embodiments. The following examples of the present disclosure may comprise subject material such as a device, a method, at least one machine-readable medium for storing instructions that when executed cause a machine to perform acts based on the method, means for perforating acts based on the method and/or a system for a flexible bootstrap code architecture, as provided below.

Example 1

According to this example there is provided a device. The device may comprise equipment to provide functionality in the device, an operating system (OS) to facilitate operation, of the equipment and a boot module to execute boot operations following activation of the device, the boot module including at least one flexible boot (FB) module to interact with at least one of the equipment or the OS during the boot operations.

Example 2

This example includes the elements of example 1, wherein the at least one FB module operates based on bytecode included in the boot module, the bytecode being interpreted during the boot operation.

Example 3

This example includes the elements of example 2, wherein the bytecode is stored in an .efi PE/COFF format compatible with an Extensible Firmware Interface (EFI) bytecode interpreter.

Example 4

This example includes the elements of any of examples 1 to 3, wherein the at least one FB module being to interact with at least one of the equipment or the OS comprises the at least one FB module being to sense a characteristic associated with at least one of the equipment or the OS.

Example 5

This example includes the elements of example 4, wherein the characteristic comprises at least one of a device identification or chipset identification sensed from the equipment.

Example 6

This example includes the elements of example 5, wherein the at least one FB module is further to cause the boot operations to be aborted if at least one of the device identification or the chipset identification is not recognized.

Example 7

This example includes the elements of example 4, wherein causing operations to be aborted comprises reporting an error to a user of the device via at least one of a visible or audible notification.

Example 8

This example includes the elements of any of examples 4 to 7, wherein the characteristic comprises sensing a type for the OS, the type for the OS including at least whether the OS is a 32-bit OS or a 64-bit OS.

Example 9

This example includes the elements of example 8, wherein the type for the OS is sensed based on a word length associated with the OS.

Example 10

This example includes the elements of example 9, wherein the word length is sensed based on calculating the size of a natural integer during the boot operations.

Example 11

This example includes the elements of any of examples 9 to 10, wherein the at least one FB module is further to cause a particular kernel to be loaded in the device during the boot operation based on the word length.

Example 12

This example includes the elements of any of examples 4 to 11, wherein the characteristic comprises boot variables existing in a particular directory in the device.

Example 13

This example includes the elements of example 12, wherein the at least one FB module is further to cause at least one of data to be copied from the boot module to the boot variables or data to be copied to the boot module from the boot variables prior to loading the OS in the device.

Example 14

This example includes the elements of any of examples 1 to 13, wherein the at least one FB module being to interact with at least one of the equipment or the OS comprises the at least one FB module being to make information in the boot module accessible to at least one of the equipment or the OS.

Example 15

This example includes the elements of example 14, wherein the equipment comprises a memory, the information to be made accessible including a physical address indicating the location of a configuration table associated with the boot module in the memory.

Example 16

This example includes the elements of example 15, wherein the at least one FB module is further to cause the physical address to be written to a non-volatile variable in the memory.

Example 17

This example includes the elements of example 16, wherein the OS comprises an application program interface to allow the OS to access the contents of the non-volatile variable in the memory.

Example 18

This example includes the elements of any of examples 1 to 17, wherein the boot module is based on the Unified Extensible Firmware interface (UEFI) specification.

Example 19

This example includes the elements of any of examples 1 to 18, wherein the at least one FB module is farther to cause the boot operations to be aborted if at least one of device identification or chipset identification sensed from the device is not recognized.

Example 20

This example includes the elements of any of examples 1 to 19, wherein the at least one FB module is farther to cause a particular kernel to be loaded in the device during the boot operation based on sensing a word length associated with the OS.

Example 21

This example includes the elements of any of examples 1 to 20, wherein, based on sensing boot variables existing in a particular directory in the device, the at least one FB module is further to cause at least one of data to be copied from the boot module to the boot variables or data to be copied to the boot module from the boot variables prior to loading the OS in the device.

Example 22

This example includes the elements of any of examples 1 to 21, wherein the at least one FB module is further to make information in the boot module accessible to at least one of the equipment or OS by causing a physical address to be written to a non-volatile variable in a memory in the device, the physical address indicating the location of a configuration table associated with the boot module.

Example 23

According to this example there is provided a method. The method may comprise initiating boot operations in a device comprising at least equipment, an operating system (OS) and a boot module, determining if the boot module includes at least one flexible boot (FB) module to interact with at least one of the equipment or the OS during the boot operations and performing default boot operations or device-specific boot operations based on the determination if the boot module includes at least one flexible boot (FB) module.

Example 24

This example includes the elements of example 23, wherein interacting with at least one of the equipment or the OS comprises sensing a characteristic associated with at least one of the equipment or the OS.

Example 25

This example includes the elements of example 24, wherein the characteristic comprises at least one of a device identification or chipset identification sensed from the equipment.

Example 26

This example includes the elements of example 25, and further comprises causing the boot operations to be aborted if at least one of the device identification or the chipset identification is not recognized.

Example 27

This example includes the elements of example 26, wherein causing operations to be aborted comprises reporting an error to a user of the device via at least one of a visible or audible notification.

Example 28

This example includes the elements of any of examples 24 to 27, wherein the characteristic comprises sensing a type for the OS, the type for the OS including at least whether the OS is a 32-bit OS or a 64-bit OS.

Example 29

This example includes the elements of example 28, wherein the characteristic comprises a word length associated with the OS.

Example 30

This example includes the elements of example 29, wherein the word length is sensed based on calculating the size of a natural integer during the boot operations.

Example 31

This example includes the elements of any of examples 29 to 30, and further comprises causing a particular kernel to be loaded in the device during the boot operation based on the word length.

Example 32

This example includes the elements of any of examples 24 to 31, wherein the characteristic comprises boot variables existing in a particular directory in the device.

Example 33

This example includes the elements of example 32, and further comprises causing at least one of data to be copied from the boot module to the boor, variables or data to be copied to the boot module from the boot variables prior to loading the OS in the device.

Example 34

This example includes the elements of any of examples 23 to 33, wherein interacting with at least one of the equipment or the OS comprises making information accessible to at least one of the equipment or the OS.

Example 35

This example includes the elements of example 34, wherein the equipment comprises a memory, the information including a physical address indicating the location of a configuration table associated with the boot module in the memory.

Example 36

This example includes the elements of example 35, and further comprises causing the physical address to be written to a non-volatile variable in the memory.

Example 3

This example includes the elements of example 36, wherein the OS comprises an application program interface to allow the OS to access the contents of the non-volatile variable in the memory.

Example 38

This example includes the elements of any of examples 23 to 37, wherein the boot module is based on the Unified Extensible Firmware Interface (UEFI) specification.

Example 39

This example includes the elements of any of examples 23 to 38, and further comprises causing the boot operations to be aborted if at least one of device identification or chipset identification, sensed from the device is not recognized.

Example 40

This example includes the elements of any of examples 23 to 39, and further comprises causing a particular kernel to be loaded it) the device during the boot, operation based on sensing a word length associated with the OS.

Example 41

This example includes the elements of any of examples 23 to 40, and farther comprises sensing boot variables existing in a particular directory in the device and causing at least one of data to be copied front the boot module to the boot variables or data to be copied to the boot module from the boot variables prior to loading the OS in the device.

Example 42

This example includes the elements of any of examples 23 to 41, and further comprises making information in the boot module accessible to at least one of the equipment or OS by causing a physical address to be written to a non-volatile variable in a memory in the device, the physical address indicating the location of a configuration table associated with the boot module.

Example 43

According to this example there is provided a system including a device, the system being arranged to perform the method of any of the above examples 23 to 42.

Example 44

According to this example there is provided a chipset arranged to perform the method of any of the above examples 23 to 42.

Example 45

According to this example there is provided at least one machine readable medium comprising a plurality of instructions that, in response to be being executed on a computing device, cause the computing device to carry out the method according to any of the above examples 23 to 42.

Example 46

According to this example there is provided a device configured with a flexible bootstrap code architecture, the device being arranged to perform the method of any of the above examples 23 to 42.

Example 47

According to this example there is provided a device having means to perform the method of any of the above examples 23 to 42.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device, comprising:
   equipment to provide functionality in the device;
   an operating system (OS) to facilitate operation of the equipment; and
   boot circuitry to:
   determine, following activation of the device, if the boot circuitry includes at least one flexible boot (FB) circuit;
   if it is determined that the boot circuitry includes at least one FB circuit, cause the at least one FB circuit to interact with at least one of the equipment or the OS, generate device-specific boot operations based on the interaction and perform the device-specific boot operations; and
   perform default boot operations if it is determined that the boot circuitry does not include at least one FB circuit.

2. The device of claim 1, wherein the at least one FB circuit operates based on bytecode included in the boot circuitry, the bytecode being interpreted during the boot operation.

3. The device of claim 1, wherein the at least one FB circuit being to generate device-specific boot operations based on the interaction comprises the at least one FB circuit being to cause the boot operations to be aborted if at least one of a device identification or a chipset identification is not recognized.

4. The device of claim 1, wherein the at least one FB circuit being to generate device-specific boot operations based on the interaction comprises the at least one FB circuit being to cause a particular kernel to be loaded in the device during the boot operation based on a word length associated with the OS.

5. The device of claim 4, wherein the word length is sensed based on calculating the size of a natural integer during the boot operations.

6. The device of claim 1, wherein the at least one FB circuit being to interact with at least one of the equipment or the OS comprises the at least one FB circuit being to sense boot variables existing in a particular directory in the device.

7. The device of claim 6, wherein the at least one FB circuit being to generate device-specific boot operations based on the interaction comprises the at least one FB circuit being to cause at least one of data to be copied from the boot circuitry to the boot variables or data to be copied to the boot circuitry from the boot variables prior to loading the OS in the device.

8. The device of claim 1, wherein the at least one FB circuit being to generate device-specific boot operations based on the interaction comprises the at least one FB circuit being to make information in the boot circuitry accessible to at least one of the equipment or the OS by causing a physical address to be written to a non-volatile variable in a memory in the device, the physical address indicating the location of a configuration table associated with the boot circuitry in the memory.

9. The device of claim 8, wherein the OS comprises an application program interface to allow the OS to access the contents of the non-volatile variable in the memory.

10. The device of claim 1, wherein the boot circuitry is configured based on the Unified Extensible Firmware Interface (UEFI) specification.

11. A method, comprising:
    initiating boot operations in a device comprising at least equipment, an operating system (OS) and boot circuitry;
    determining if the boot circuitry includes at least one flexible boot (FB) circuit to interact with at least one of the equipment or the OS during the boot operations; and
    performing default boot operations or device-specific boot operations based on the determination if the boot circuitry includes at least one FB circuit.

12. The method of claim 11, wherein performing device-specific boot operations comprises causing the boot operations to be aborted if at least one of a device identification or a chipset identification sensed from the equipment is not recognized.

13. The method of claim 11, wherein performing device-specific boot operations comprises causing a particular kernel to be loaded in the device during the boot operation based on a word length associated with the OS.

14. The method of claim 13, wherein the word length is sensed based on calculating the size of a natural integer during the boot operations.

15. The method of claim 11, wherein interacting with at least one of the equipment or the OS during the boot operations comprises sensing boot variables existing in a particular directory in the device.

16. The method of claim 15, wherein performing device-specific boot operations comprises causing at least one of data to be copied from the boot circuitry to the boot variables or data to be copied to the boot circuitry from the boot variables prior to loading the OS in the device.

17. The method of claim 11, wherein performing device-specific boot operations comprises making information in the boot circuitry accessible to at least one of the equipment or the OS by causing a physical address to be written to a non-volatile variable in a memory in the device, the physical address indicating the location of a configuration table associated with the boot circuitry in the memory.

18. At least one machine-readable storage medium having stored thereon, individually or in combination, instructions that when executed by one or more processors result in the following operations comprising:
   initiating boot operations in a device comprising at least equipment, an operating system (OS) and boot circuitry;
   determining if the boot circuitry includes at least one flexible boot (FB) circuit to interact with at least one of the equipment or the OS during the boot operations; and
   performing default boot operations or device-specific boot operations based on the determination if the boot circuitry includes at least one FB circuit.

19. The medium of claim 18, wherein performing device-specific boot operations comprises causing the boot operations to be aborted if at least one of a device identification or a chipset identification sensed from the equipment is not recognized.

20. The medium of claim 18, wherein performing device-specific boot operations comprises causing a particular kernel to be loaded in the device during the boot operation based on a word length associated with the OS.

21. The medium of claim 20, wherein the word length is sensed based on calculating the size of a natural integer during the boot operations.

22. The medium of claim 18, wherein interacting with at least one of the equipment or the OS during the boot operations comprises sensing boot variables existing in a particular directory in the device.

23. The medium of claim 22, wherein performing device-specific boot operations comprises causing at least one of data to be copied from the boot circuitry to the boot variables or data to be copied to the boot circuitry from the boot variables prior to loading the OS in the device.

24. The medium of claim 18, wherein performing device-specific boot operations comprises making information in the boot circuitry accessible to at least one of the equipment or the OS by causing a physical address to be written to a non-volatile variable in a memory in the device, the physical address indicating the location of a configuration table associated with the boot circuitry in the memory.

\* \* \* \* \*